United States Patent
Yin et al.

(10) Patent No.: US 8,374,239 B2
(45) Date of Patent: Feb. 12, 2013

(54) METHOD AND APPARATUS FOR MACROBLOCK ADAPTIVE INTER-LAYER INTRA TEXTURE PREDICTION

(75) Inventors: Peng Yin, West Windsor, NJ (US); Jill MacDonald Boyce, Manalapan, NJ (US); Purvin Bibhas Pandit, Franklin Park, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1338 days.

(21) Appl. No.: 11/988,696

(22) PCT Filed: May 18, 2006

(86) PCT No.: PCT/US2006/019212
§ 371 (c)(1),
(2), (4) Date: Jan. 11, 2008

(87) PCT Pub. No.: WO2007/008286
PCT Pub. Date: Jan. 18, 2007

(65) Prior Publication Data
US 2009/0074061 A1   Mar. 19, 2009

Related U.S. Application Data

(60) Provisional application No. 60/698,140, filed on Jul. 11, 2005.

(51) Int. Cl.
*H04N 7/12* (2006.01)
(52) U.S. Cl. .......... 375/240.12; 375/240.16; 375/240.24
(58) Field of Classification Search ............... 375/240.1, 375/240.12, 240.16, 240.26
See application file for complete search history.

(56) References Cited

U.S. PATENT DOCUMENTS

| | | | |
|---|---|---|---|
| 5,122,875 A | 6/1992 | Raychaudhuri et al. | |
| 5,922,664 A | 7/1999 | Cao et al. | |
| 6,493,387 B1 * | 12/2002 | Shin et al. | 375/240.1 |
| 6,580,754 B1 * | 6/2003 | Wan et al. | 375/240.01 |
| 6,980,667 B2 * | 12/2005 | Hamanaka | 382/239 |
| 7,847,861 B2 * | 12/2010 | Zhai et al. | 348/394.1 |
| 7,899,115 B2 * | 3/2011 | Jeon et al. | 375/240.1 |
| 7,974,341 B2 * | 7/2011 | Chen et al. | 375/240.1 |
| 2006/0062299 A1 * | 3/2006 | Park et al. | 375/240.12 |
| 2006/0153295 A1 * | 7/2006 | Wang et al. | 375/240.08 |
| 2006/0233250 A1 * | 10/2006 | Cha et al. | 375/240.12 |
| 2007/0139228 A1 * | 6/2007 | Pearlstein et al. | 341/50 |

(Continued)

FOREIGN PATENT DOCUMENTS

| | | |
|---|---|---|
| CA | 2211313 | 2/1998 |
| EP | 0 644 695 A2 | 3/1995 |

(Continued)

OTHER PUBLICATIONS

Buchner, Christian et al., "Progressive texture video coding", Proceedings. (ICASSP'01). 2001 IEEE Int'l. Conference on Acoustics, Speech, and Signal Processing, vol. 3, pp. 1813-1816, May 2001.

(Continued)

*Primary Examiner* — Hassan Kizou
*Assistant Examiner* — Emmanuel Maglo
(74) *Attorney, Agent, or Firm* — Robert D. Shedd; Guy H. Eriksen

(57) ABSTRACT

There are provided scalable video encoders and decoders and corresponding methods for scalable video encoding and decoding. A scalable video encoder includes an encoder for selectively using spatial intra prediction to code, on a macroblock adaptive basis, an enhancement layer residue generated between an enhancement layer macroblock and a corresponding upsampled base layer macroblock.

40 Claims, 5 Drawing Sheets

U.S. PATENT DOCUMENTS

2008/0304567 A1* 12/2008 Boyce et al. .............. 375/240.16
2009/0187960 A1* 7/2009 Lee et al. ...................... 725/131

FOREIGN PATENT DOCUMENTS

| RU | 2128405 C1 | 3/1999 |
|---|---|---|
| WO | 94/16680 A1 | 8/1994 |
| WO | 96/32464 A1 | 10/1996 |
| WO | 01/40431 A1 | 6/2001 |

OTHER PUBLICATIONS

De Wolf, Koen, "Scalable video coding: prediction of residual information", Sixth FirW PhD Symposium, Faculty of Engineering, Ghent University, Nov. 30, 2005, paper No. 115, Abstract, section III.

Jin, Xin, et al.,"H.264-Compatible spatially Scalable Video Coding with In-Band Prediction," Image Processing, ICIP 2005, IEEE Int'l. Conference, vol. 1, Sep. 11-14, 2005 pp. 489-492.

Kang, Hae-Yong et al. "MPEG4 AVC/H.264 Decoder with Scalable Bus Architecture and Dual Memory Controller," Circuits & Systems, 2004, ISCAS '04, Proceedings of 2004 Int'l. Symposium, vol. 2, May 23-26, 2004, pp. II-145-II-148.

Reichel, J. et al., "Scalable Video Coding—Working Draft 2", ISO/IEC JTC1/SC29/WG11: 15th meeting: Busan,KR; Apr. 2005; pp. 1-97.

Yin, P., et al., "Complexity Scalable Video Codec", ISO/IEC JTC1/SC29/WG11, Int'l. Organization for Standardization, Coding of Moving Pictures and Audio, No. M11241, Palma de Mallorca, Oct. 2004.

Search report dated Oct. 20, 2006.

Blaszak, L et al, "Scalable AVC Codec", MPEG Meeting, Mar. 15, 2004—Mar. 19, 2004; (Motion Picture Expert Group or ISO/IEC JTC1/SC29/WG11), No. M10626, Mar. 6, 2012, Munich.

Dugad, R. et al., "A Scheme for Spatial Scalability Using Nonscalable Encoders", International Transactions on Circuit and Systems for Video Technology, vol. 13, No. 10, Oct. 10, 2003, pp. 993-999.

Reichel, J. et al., "Joint Scalable Video Model JSVM 1", Joint Video Team (JVT) of ISO/IEC MPEG & ITU-T VCEG (ISO/IEC JTC1/SC29/WG11 and ITU-T SG16 Q.6), 14th Meeting,: Hong Kong, CN, Jan. 17-21, 2005, JVT-N023.

Richardson, J., Video Coding H.264 and MPEG-4—new generation standards, Moscow, Techno sphere, Official Translation of Publication 2003, p. 186-205, 222-233.

Sullivan, G. et al., "Document allocation to subject areas and notes of meeting", Joint Video Team (JVT) of ISO/IEC MPEG & ITU-T VCEG (ISO/IEC JTC1/SC29/WG11 and ITU-T SG16 Q.6), JVT-O001.

Xiong, L., "Improving enhancement layer intra prediction", Joint Video Team (JVT) of ISO/IEC MPEG & ITU-T VCEG (ISO/IEC JTC1/SC29/WG11 and ITU-T SG16 Q.6) 15th Meeting, Busan, KR, Apr. 16-22, 2005, JVT-0029, pp. 1-9.

Schwartz, H. et al., "Technical Description of the HHI Proposal for SVC CE1", ITU Study Group 16—Video Coding Experts Group—ISO/IEC MPEG & ITU-T VCEG (ISO/IEC JTC1/SC29/WG11 and ITU-T SG16 Q6), Oct. 2004, Palma de Mallorca, Spain, MPEG 2004/M11244.

Sun, S. et al., "Extended Spatial Scalability with Picture-Level Adaptation", Joint Video Team (JVT) of ISO/IEC MPEG & ITU-T VCEG (ISO/IEC JTC1/SC29/WG11 and ITU-T SG16 Q.6), 15th Meeting, Busan, KR, Apr. 16-22, 2005, JVT-O008.

Yin, P. et al., "Technical description of the Thomson proposal for SVC CE4", ISO/IEC JTC1/SC29/WG1, MPEG2004/M11682, Hong Kong, Jan. 2005.

Yin, P. et al., "Technical description of the Thomson proposal for SVC CE7—spatial intra prediction on enhancement layer residue", Joint Video Team (JVT) of ISO/IEC MPEG & ITU-T VCEG (ISO/IEC JTC1/SC29/WG11 and ITU-T SG16 Q.6) JVT-053, 13th Meeting: Busan, KR, Apr. 18-22, 2005.

Schaefer, R. et al., "MCTF and Scalability Extension of H.264/AVC and its Application to Video Transmission, Storage, and Surveillance", Proc. SPIE., vol. 5960, pp. 343-354, Jul. 12, 2005, HHI Institute, Berlin, Germany.

Wu, F. et al., "Efficient and Universal Scalable Video Coding", IEEE ICIP 2002, pgs., II-37-40, Microsoft Research, Asia, Beijing Institute of Technology, Beijing, and Harbin Institute of Technology, Harbin, Sep. 2002.

* cited by examiner

METHOD AND APPARATUS FOR MACROBLOCK ADAPTIVE INTER-LAYER INTRA TEXTURE PREDICTION

CROSS-REFERENCE TO RELATED APPLICATIONS

This application claims the benefit, under 35 U.S.C. §365 of International Application PCT/US2006/019212, filed May 18, 2006, which was published in accordance with PCT Article 21(2) on Jan. 18, 2007 in English and which claims the benefit of U.S. provisional patent application No. 60/698,140, filed Jul. 11, 2005.

FIELD OF THE INVENTION

The present invention relates generally to video encoders and decoders and, more particularly, to methods and apparatus for macroblock adaptive inter-layer intra texture prediction.

BACKGROUND OF THE INVENTION

Many different methods of scalability have been widely studied and standardized, including signal-to-noise ratio (SNR) scalability, spatial scalability, temporal scalability, and fine grain scalability, in scalability profiles of, e.g., the International Organization for Standardization/International Electrotechnical Commission (ISO/IEC) Moving Picture Experts Group-2 (MPEG-2) standard, and the ISO/IEC MPEG-4 Part 10/International Telecommunication Union, Telecommunication Sector (ITU-T) H.264 standard (hereinafter the "H.264 standard"). Most scalable video coding schemes achieve scalability at the cost of coding efficiency. It is thus desirable to improve coding efficiency while, at most, adding minor complexity. Most widely used techniques for spatial scalability and SNR scalability are inter-layer prediction techniques, including inter-layer intra texture prediction, inter-layer motion prediction and inter-layer residue prediction.

For spatial and SNR scalability, a large degree of inter-layer prediction is incorporated. Intra and inter macroblocks can be predicted using the corresponding signals of previous layers. Moreover, the motion description of each layer can be used for a prediction of the motion description for the following enhancement layers. These techniques fall into three categories: inter-layer intra texture prediction, inter-layer motion prediction, and inter-layer residue prediction.

In JSVM2.0, intra texture prediction using information from the previous layer is provided in the INTRA_BL macroblock mode, where the enhancement layer residue (the difference between the current macroblock (MB) and the (upsampled) base layer) is transformed and quantized. INTRA_BL mode is very efficient when the enhancement layer residue does not include too much edge information.

The following three possible configurations can be applied for the INTRA_BL macroblock mode: unrestricted inter-layer intra texture prediction; constrained inter-layer intra texture prediction; and constrained inter-layer texture prediction for single loop decoding.

Regarding the unrestricted inter-layer intra texture prediction configuration, the inter-layer intra texture prediction can be applied to any block without restrictions on the layer from which predictions are made. In this configuration, the decoder has to decode all lower spatial resolutions that are provided in the bitstream for the reconstruction of the target resolution.

Regarding the constrained inter-layer intra texture prediction configuration, the inter-layer intra texture prediction can be applied to macroblocks for which the corresponding blocks of the base layer are located inside intra-coded macroblocks. With this mode, the inverse MCTF is only required for the spatial layer that is actually decoded. For key pictures, multiple decoding loops are required.

Regarding the constrained inter-layer intra texture prediction configuration for single-loop decoding, the inter-layer intra texture prediction can be applied to macroblocks for which the corresponding blocks of the base layer are located inside intra-coded macroblocks for the MCTF as well as for key pictures. In this configuration, only a single decoding loop at the target spatial resolution is required.

SUMMARY OF THE INVENTION

These and other drawbacks and disadvantages of the prior art are addressed by the present invention, which is directed to methods and apparatus for macroblock adaptive inter-layer intra texture prediction.

According to an aspect of the present invention, there is provided a scalable video encoder. The scalable video encoder includes an encoder for selectively using spatial intra prediction to code, on a macroblock adaptive basis, an enhancement layer residue generated between an enhancement layer macroblock and a corresponding upsampled base layer macroblock.

According to another aspect of the present invention, there is provided a method for scalable video encoding. The method includes selectively using spatial intra prediction to code, on a macroblock adaptive basis, an enhancement layer residue generated between an enhancement layer macroblock and a corresponding upsampled base layer macroblock.

According to yet another aspect of the present invention, there is provided a scalable video encoder. The scalable video encoder includes an encoder for coding an enhancement layer using both a spatial neighboring intra prediction mode in the enhancement layer and an upsampled corresponding base layer prediction mode.

According to still another aspect of the present invention, there is provided a method for scalable video encoding. The method includes coding an enhancement layer using both a spatial neighboring intra prediction mode in the enhancement layer and an upsampled corresponding base layer prediction mode.

According to a further aspect of the present invention, there is provided a scalable video decoder. The scalable video decoder includes a decoder for selectively using spatial intra prediction to decode, on a macroblock adaptive basis, an enhancement layer residue generated between an enhancement layer macroblock and a corresponding upsampled base layer macroblock.

According to an additional aspect of the present invention, there is provided a method for scalable video decoding. The method includes selectively using spatial intra prediction to decode, on a macroblock adaptive basis, an enhancement layer residue generated between an enhancement layer macroblock and a corresponding upsampled base layer macroblock.

According to a further additional aspect of the present invention, there is provided a scalable video decoder. The scalable video decoder includes a decoder for decoding an enhancement layer using both a spatial neighboring intra prediction mode in the enhancement layer and an upsampled corresponding base layer prediction mode.

According to a yet further aspect of the present invention, there is provided a method for scalable video decoding. The method includes decoding an enhancement layer using both a spatial neighboring intra prediction mode in the enhancement layer and an upsampled corresponding base layer prediction mode.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
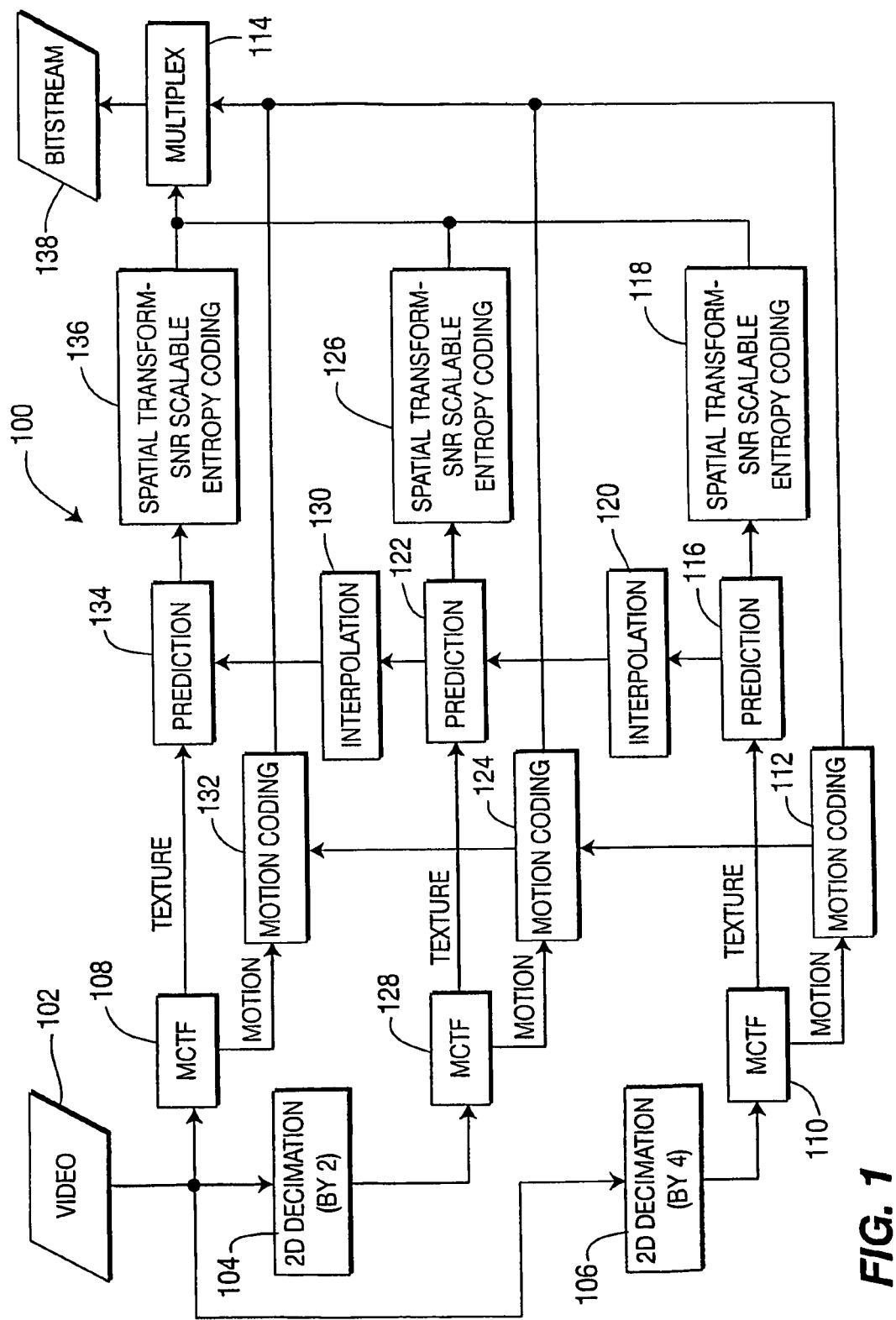
FIG. 1 shows a block diagram for an exemplary Joint Scalable Video Model (JSVM) 2.0 encoder to which the present principles may be applied.

The present invention is directed to methods and apparatus for macroblock adaptive inter-layer intra texture prediction.

In most scalable video coding schemes, a large degree of inter-layer prediction is incorporated for spatial and SNR scalability. The inter-layer prediction includes inter-layer intra texture prediction, inter-layer motion prediction and inter-layer residue prediction. In accordance with the present principles, a novel inter-layer intra texture prediction is provided. Moreover, in accordance with an exemplary embodiment thereof, the present principles may be combined with an existed approach in a macroblock-adaptive way to achieve further coding efficiency.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

In accordance with the present principles, method and apparatus are provided for inter-layer intra texture prediction. In accordance with an exemplary embodiment, inter-layer intra texture prediction is improved by also allowing spatial intra prediction of the enhancement layer residue using the method specified in sub-clause 8.3 of the H.264 standard (the relevant method specified in sub-clause 8.3 is also referred to herein as INTRA_BLS) for the spatial intra prediction of the enhancement layer residue.

One reason for the use of INTRA_BLS is that for spatial scalability, the enhancement layer residue in general includes a lot of high frequency components, such as edges. Spatial Intra prediction should help to maintain more details, especially at higher bitrates. However, the approach of the present principles may involve coding more syntax bits than INTRA_BL, such as, e.g., mb_type, intra prediction modes (PredMode) or cbp pattern if INTRA16×16 is selected. To combine the advantage of both INTRA_BL and INTRA_BLS, a macroblock adaptive approach to select INTRA_BL or INTRA_BLS is proposed in accordance with the present principles. To reduce the overhead of spatial intra prediction, an approach is also provided herein to simplify the syntax by jointly considering the (upsampled) base layer intra prediction mode and most probable mode from spatial neighbors in the enhancement layer.

For INTRA_BL mode, at the decoder side, the inter-layer residue after inverse quantization and inverse transformation is added directly to the (upsampled) reconstructed base layer to form the reconstructed enhancement layer macroblock. For INTRA_BLS mode, at the decoder side, the neighboring macroblock residuals from the (upsampled) reconstructed base layer are adjusted by adding 128 and clipping to (0, 255), and then used for spatial intra prediction for the current macroblock as specified in subclause 8.3 of the H.264 standard. The received residue after inverse quantization and inverse transformation is then added to the spatial intra prediction. A subtraction of 128 and clipping to (−256, 255) is then performed. The inter-layer intra predicted residue is then combined with the (upsampled) reconstructed base layer to form the reconstructed enhancement layer macroblock.

To enable macroblock adaptive selection of INTRA_BL mode and INTRA_BLS mode, a flag, referred to herein as intra_bls_flag, is utilized to signal which mode is used for each macroblock. In the H.264 standard, for scalable video coding, if the constraint is imposed to allow INTRA_BLS mode only when the corresponding base layer macroblock is coded as intra, the existing syntax may be utilized. In such a case, the base_mode_flag is used to specify if the mb_type for the current macroblock can be inferred from the corresponding base macroblock. The intra_base_flag is used to specify if INTRA_BL mode is used. When the corresponding base layer macroblock is coded as intra, then the base_mode_flag being equal to 1 can be used to infer that intra_base_flag is equal to 1, which means that only base_mode_flag equal to 1 may be coded. To signal INTRA_BLS mode, base_mode_flag may be set to 0 and intra_base_flag may be set to 1.

Turning to FIG. 1, an exemplary Joint Scalable Video Model Version 2.0 (hereinafter "JSVM2.0") encoder to which the present invention may be applied is Indicated generally by the reference numeral 100. The JSVM2.0 encoder 100 uses three spatial layers and motion compensated temporal filtering. The JSVM encoder 100 includes a two-dimensional (2D) decimator 104, a 2D decimator 106, and a motion compensated temporal filtering (MCTF) module 108, each having an input for receiving video signal data 102.

An output of the 2D decimator 106 is connected in signal communication with an input of a MCTF module 110. A first output of the MCTF module 110 is connected in signal communication with an input of a motion coder 112, and a second output of the MCTF module 110 is connected in signal communication with an input of a prediction module 116. A first output of the motion coder 112 is connected in signal communication with a first input of a multiplexer 114. A second output of the motion coder 112 is connected in signal communication with a first input of a motion coder 124. A first output of the prediction module 116 is connected in signal communication with an input of a spatial transformer 118. An output of the spatial transformer 118 is connected in signal communication with a second input of the multiplexer 114. A second output of the prediction module 116 is connected in signal communication with an input of an interpolator 120. An output of the interpolator is connected in signal communication with a first input of a prediction module 122. A first output of the prediction module 122 is connected in signal communication with an input of a spatial transformer 126. An output of the spatial transformer 126 is connected in signal communication with the second input of the multiplexer 114. A second output of the prediction module 122 is connected in signal communication with an input of an interpolator 130. An output of the interpolator 130 is connected in-signal communication with a first input of a prediction module 134. An output of the prediction module 134 is connected in signal communication with a spatial transformer 136. An output of the spatial transformer is connected in signal communication with the second input of a multiplexer 114.

An output of the 2D decimator 104 is connected in signal communication with an input of a MCTF module 128. A first output of the MCTF module 128 is connected in signal communication with a second input of the motion coder 124. A first output of the motion coder 124 is connected in signal communication with the first input of the multiplexer 114. A second output of the motion coder 124 is connected in signal communication with a first input of a motion coder 132. A second output of the MCTF module 128 is connected in signal communication with a second input of the prediction module 122.

A first output of the MCTF module 108 is connected in signal communication with a second input of the motion coder 132. An output of the motion coder 132 is connected in signal communication with the first input of the multiplexer 114. A second output of the MCTF module 108 is connected in signal communication with a second input of the prediction module 134. An output of the multiplexer 114 provides an output bitstream 138.

For each spatial layer, a motion compensated temporal decomposition is performed. This decomposition provides temporal scalability. Motion information from lower spatial layers can be used for prediction of motion on the higher layers. For texture encoding, spatial prediction between successive spatial layers can be applied to remove redundancy. The residual signal resulting from intra prediction or motion compensated inter prediction is transform coded. A quality base layer residual provides minimum reconstruction quality at each spatial layer. This quality base layer can be encoded into an H.264 standard compliant stream if no inter-layer prediction is applied. For quality scalability, quality enhancement layers are additionally encoded. These enhancement layers can be chosen to either provide coarse or fine grain quality (SNR) scalability.

Figure 2:
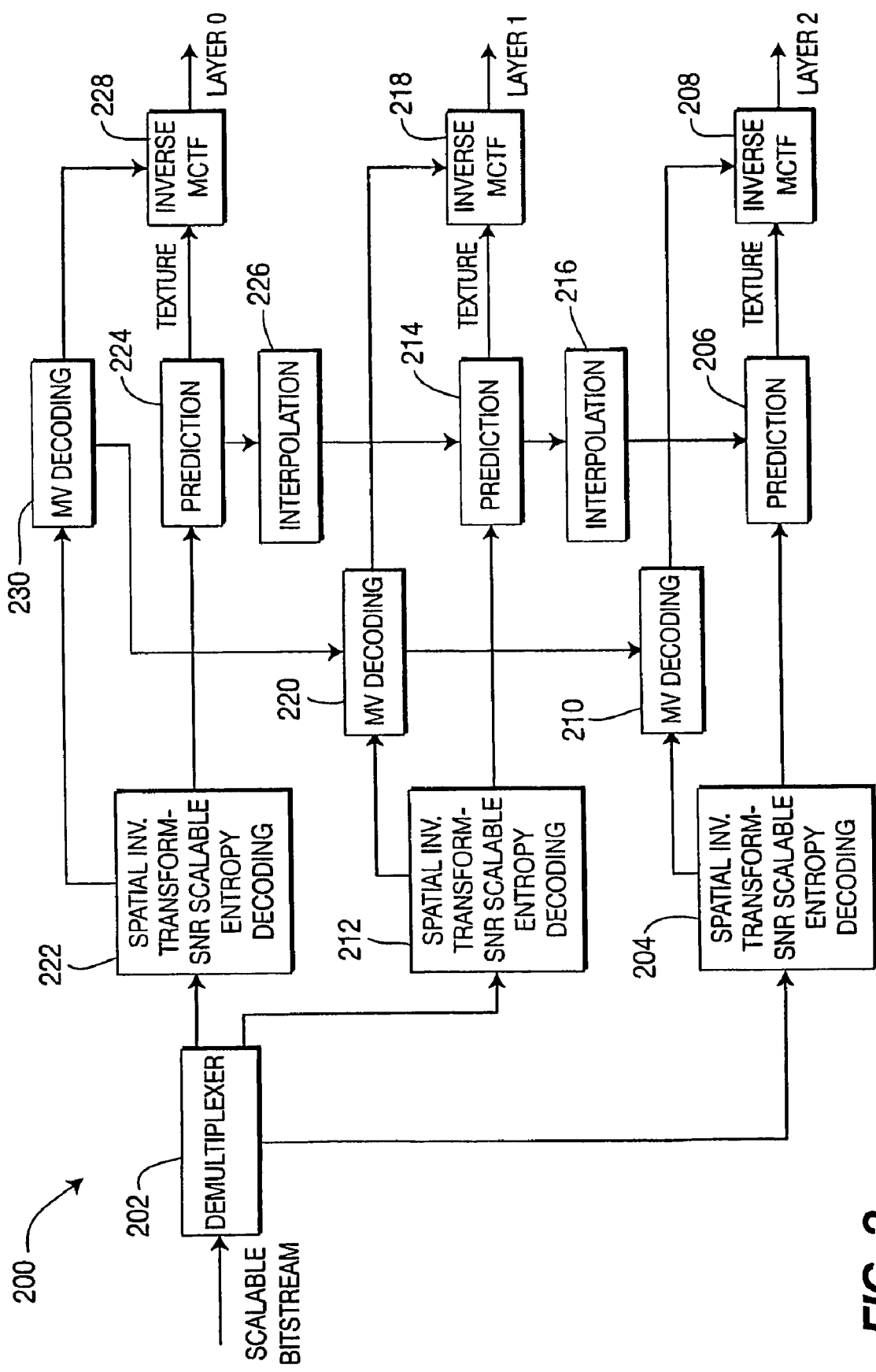
FIG. 2 shows a block diagram for an exemplary decoder to which the present principles may be applied.

Turning to FIG. 2, an exemplary scalable video decoder to which the present invention may be applied is indicated generally by the reference numeral 200. An input of a demultiplexer 202 is available as an input to the scalable video decoder 200, for receiving a scalable bitstream. A first output of the demultiplexer 202 is connected in signal communication with an input of a spatial inverse transform SNR scalable entropy decoder 204. A first output of the spatial inverse transform SNR scalable entropy decoder 204 is connected in signal communication with a first input of a prediction module 206. An output of the prediction module 206 is connected in signal communication with a first input of an inverse MCTF module 208.

A second output of the spatial inverse transform SNR scalable entropy decoder 204 is connected In signal communication with a first input of a motion vector (MV) decoder 210. An output of the MV decoder 210 is connected in signal communication with a second input of the inverse MCTF module 208.

A second output of the demultiplexer 202 is connected in signal communication with an input of a spatial inverse transform SNR scalable entropy decoder 212. A first output of the spatial inverse transform SNR scalable entropy decoder 212 is connected in signal communication with a first input of a prediction module 214. A first output of the prediction module 214 is connected in signal communication with an input of an interpolation module 216. An output of the interpolation module 216 is connected in signal communication with a second input of the prediction module 206. A second output of the prediction module 214 is connected in signal communication with a first input of an inverse MCTF module 218.

A second output of the spatial inverse transform SNR scalable entropy decoder 212 is connected in signal communication with a first input of an MV decoder 220. A first output of the MV decoder 220 is connected in signal communication with a second input of the MV decoder 210. A second output of the MV decoder 220 is connected in signal communication with a second input of the inverse MCTF module 218.

A third output of the demultiplexer 202 is connected in signal communication with an input of a spatial inverse transform SNR scalable entropy decoder 222. A first output of the spatial inverse transform SNR scalable entropy decoder 222 is connected in signal communication with an input of a prediction module 224. A first output of the prediction module 224 is connected in signal communication with an input of an interpolation module 226. An output of the interpolation module 226 is connected in signal communication with a second input of the prediction module 214.

A second output of the prediction module 224 is connected in signal communication with a first input of an inverse MCTF module 228. A second output of the spatial inverse transform SNR scalable entropy decoder 222 is connected in signal communication with an input of an MV decoder 230. A first output of the MV decoder 230 is connected in signal communication with a second input of the MV decoder 220. A second output of the MV decoder 230 is connected in signal communication with a second input of the inverse MCTF module 228.

An output of the inverse MCTF module 228 is available as an output of the decoder 200, for outputting a layer 0 signal. An output of the inverse MCTF module 218 is available as an output of the decoder 200, for outputting a layer 1 signal. An output of the inverse MCTF module 208 is available as an output of the decoder 200, for outputting a layer 2 signal.

TABLE 1 illustrates how the syntax for INTRA_BL mode and INTRA_BLS mode is interpreted when the corresponding base layer mode is intra. If the corresponding base layer mode is not intra, INTRA_BL is indicated by base_mode_flag=0 and intra_base_flag=1, and INTRA_BLS is not allowed.

TABLE 1

|  | base_mode_flag | intra_base_flag |
| --- | --- | --- |
| INTRA_BL | 1 | 1 (inferred) |
| INTRA_BLS | 0 | 1 |

Figure 3:
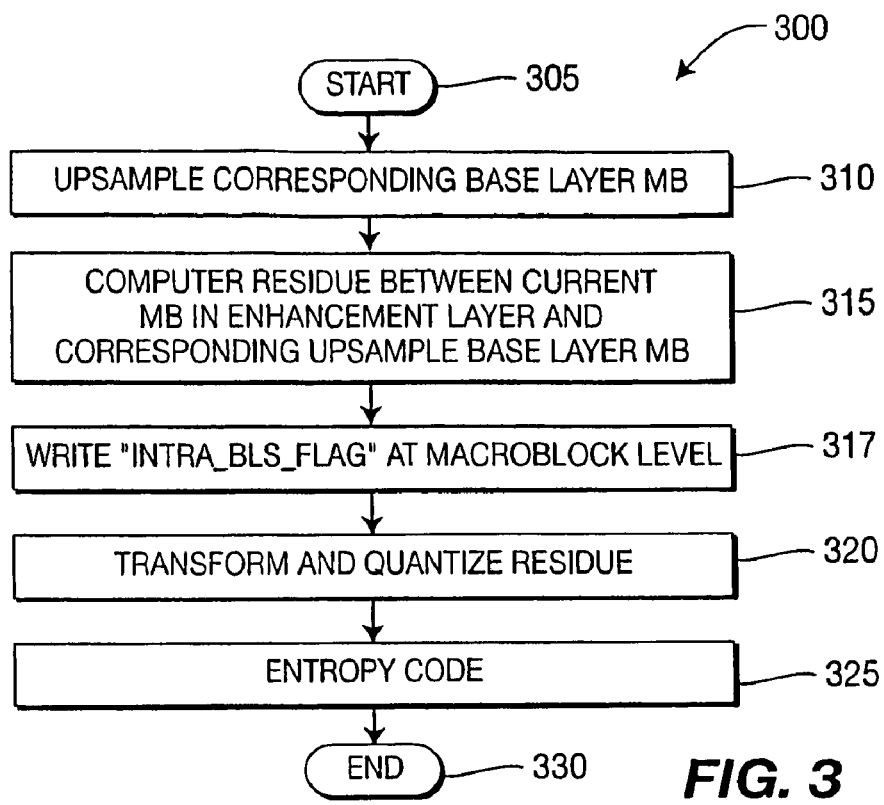
FIG. 3 shows a flow diagram for an encoding process for INTRA_BL to which the present principles may be applied.

Turning to FIG. 3, an encoding process for INTRA_BL to which the present principles may be applied is indicated by the reference numeral 300. It is to be appreciated that the encoding process 300 for INTRA_BL has been modified to add a syntax field in a macroblock header, as described with respect to function block 317.

A start block 305 passes control to a function block 310. The function block 310 upsamples the corresponding base layer macroblock, and passes control to a function block 315. The function block 315 computes the residue between the current macroblock in the enhancement layer and a corresponding upsampled base layer macroblock, and passes control to a function block 317. The function block 317 writes the syntax "intra_bls_flag" at the macroblock level, and passes control to a function block 320. The function block 320 transforms and quantizes the residue, and passes control to a function block 325. The function block 325 entropy codes the transformed and quantized residue to form a coded bitstream, and passes control to an end block 330.

Figure 4:
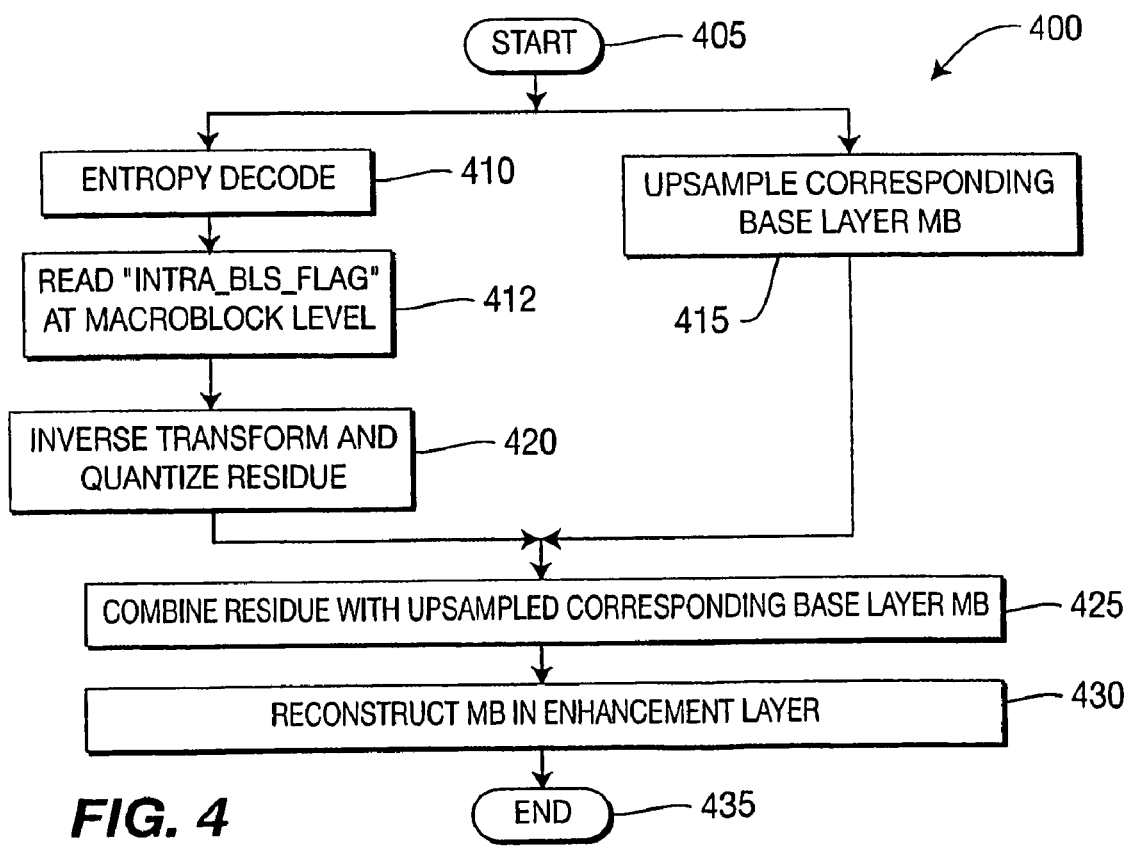
FIG. 4 shows a flow diagram for a decoding process for INTRA_BL to which the present principles may be applied.

Turning to FIG. 4, a decoding process for INTRA_BL to which the present principles may be applied is indicated by the reference numeral 400. It is to be appreciated that the decoding process 400 for INTRA_BL has been modified to read a syntax field in a macroblock header, as described with respect to function block 412.

A start block 405 passes control to a function block 410 and a function block 415. The function block 410 entropy decodes a coded bitstream to provide an uncompressed bitstream, and passes control to a function block 412. The function block 412 reads the syntax "intra_bls_flag" at the macroblock level, and passes control to a function block 420. The function block 420 inverse transforms and inverse quantizes the uncompressed bitstream to provide a decoded residue, and passes control to a function block 425. The function block 415 upsamples a corresponding base layer macroblock, and passes control to the function block 425.

The function block 425 combines the decoded residue and the upsampled corresponding base layer macroblock, and passes control to a function block 430. The function block 430 reconstructs the corresponding macroblock in the enhancement layer, and passes control to an end block 435.

Figure 5:
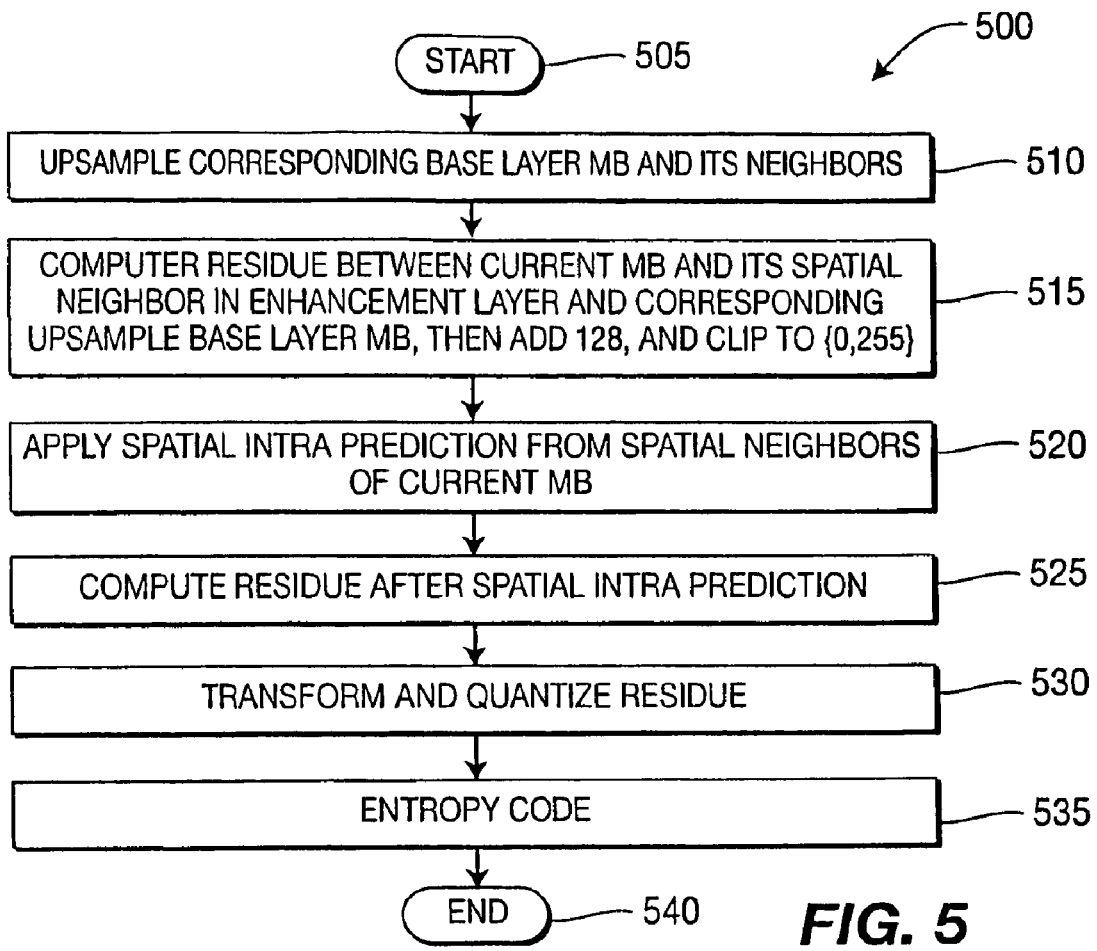
FIG. 5 shows a flow diagram for an encoding process for INTRA_BLS to which the present principles may be applied.

Turning to FIG. 5, an encoding process for INTRA_BLS to which the present principles may be applied is indicated by the reference numeral 500.

A start block 505 passes control to a function block 510. The function block 510 upsamples the corresponding base layer macroblock and the neighbors of the corresponding base layer macroblock, and passes control to a function block 515. The function block 515 computes the residue between the current macroblock and a spatial neighbor of the current macroblock in the enhancement layer and corresponding upsampled base layer macroblock, then adds 128, clips to {0, 255}, and passes control to a function block 520. The function block 520 applies spatial intra prediction from spatial neighbors of the current macroblock, and passes control to a function block 525. The function block 525 computes the residue after spatial intra prediction, and passes control to a function block 530. The function block 530 transforms and quantizes the residue, and passes control to a function block 535. The function block 535 entropy codes the transformed and quantize residue to form a coded bitstream, and passes control to an end block 540.

Figure 6:
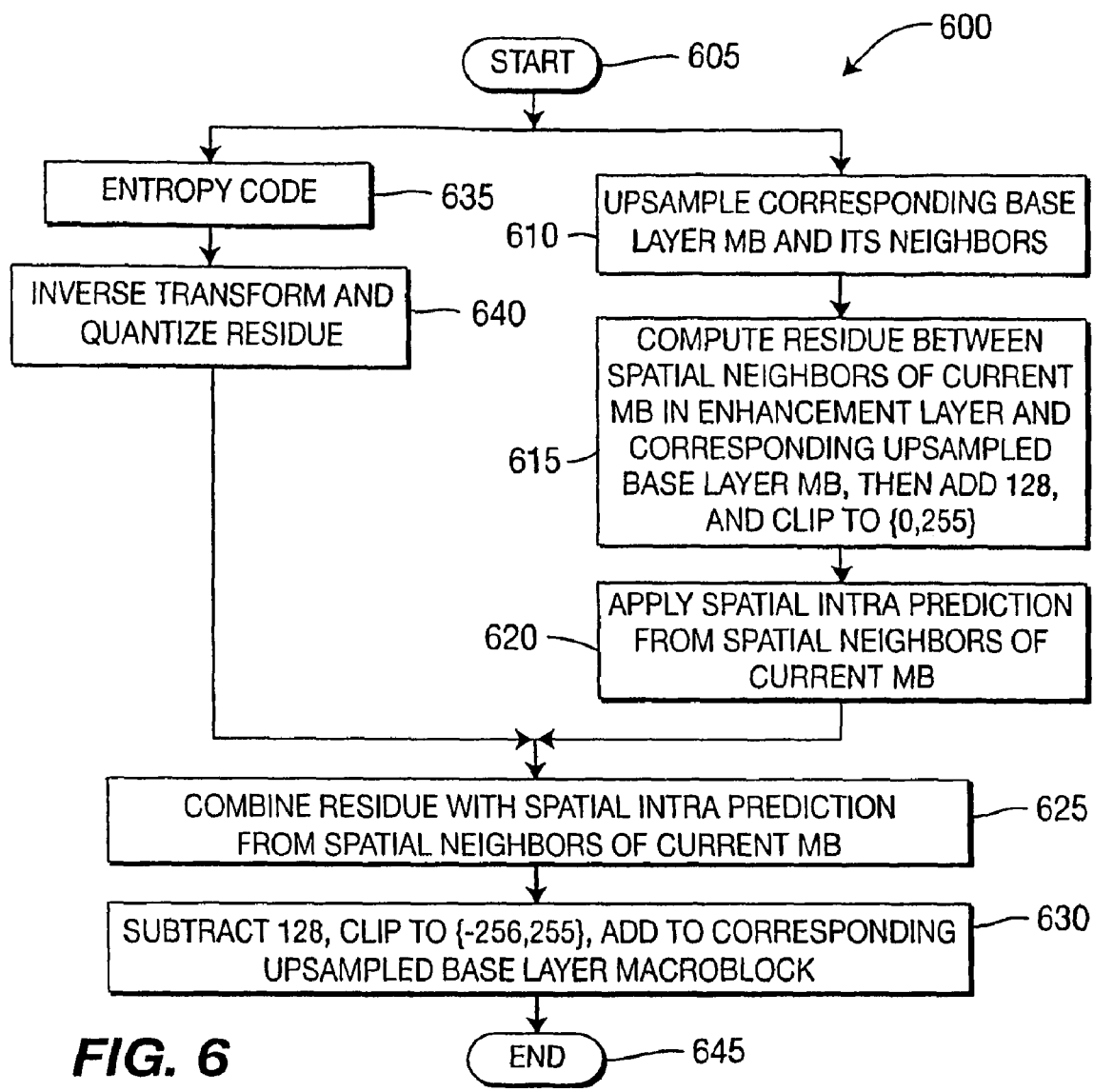
FIG. 6 shows a flow diagram for a decoding process for INTRA_BLS to which the present principles may be applied.

Turning to FIG. 6, a decoding process for INTRA_BLS to which the present principles may be applied is indicated by the reference numeral 600.

A start block 605 passes control to a function block 610 and a function block 635. The function block 610 upsamples the corresponding base layer macroblock and neighbors of the corresponding base layer macroblock, and passes control to a function block 615. The function block 615 computes the residue between spatial neighbors of the current macroblock in the enhancement layer and the corresponding upsampled base layer macroblock, then adds 128, clips to {−256, 255}, and passes control to a function block 620. The function block 620 applies spatial intra prediction from spatial neighbors of the current macroblock, and passes control to a function block 625.

The function block 635 entropy decodes the coded bitstream to provide an uncompressed bitstream, and passes control to a function block 640. The function block 640 inverse transforms and inverse quantizes the uncompressed bitstream to provide a decoded prediction residue, and passes control to the function block 625.

The function block 625 combines the decoded prediction residue with the spatial intra prediction from the spatial neighbors of the current macroblock to provide a sum, and passes control to a function block 630. The function block 630 subtracts 128 from the sum to obtain a difference, clips the difference to {−256, 256}, and adds the clipped difference to the corresponding upsampled base layer macroblock, passes control to an end block 635.

Figure 7:
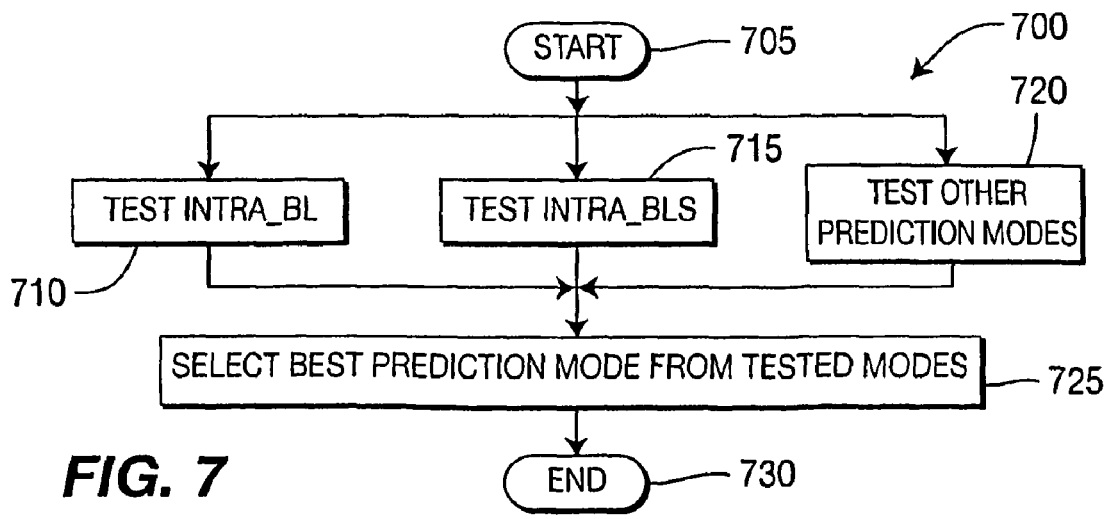
FIG. 7 shows a flow diagram for an exemplary encoding process for macroblock adaptive selection of INTRA_BL and INTRA_BLS modes in accordance with the present principles.

Turning to FIG. 7, an exemplary encoding process for macroblock adaptive selection of INTRA_BL and INTRA_BLS modes is indicated by the reference numeral 700.

A start block 705 passes control to a function block 710, a function block 715, and a function block 720. The function blocks 710, 720, and 730 test INTRA_BL, INTRA_BLS, and other prediction modes, respectively, and pass control to a function block 725. The function block 725 selects the best prediction mode from among the INTRA_BL, INTRA_BLS, and the other prediction modes, and passes control to an end block 730.

Figure 8:
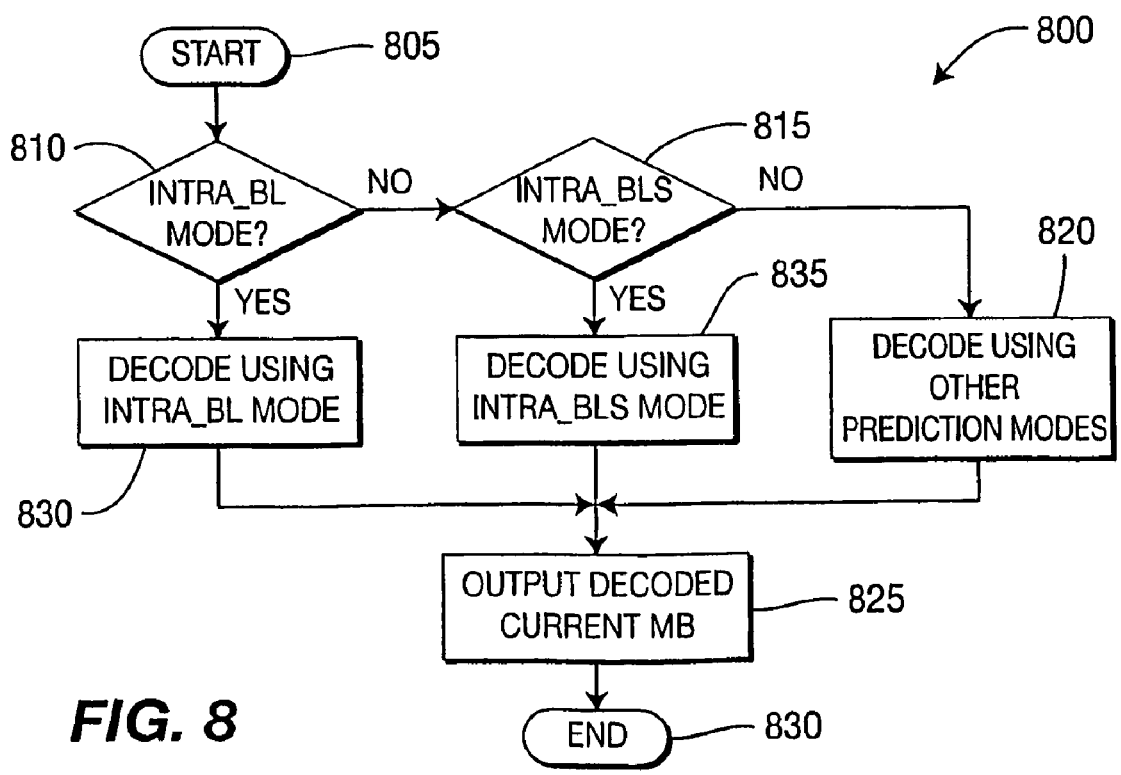
FIG. 8 shows a flow diagram for an exemplary decoding process for macroblock adaptive selection of INTRA_BL and INTRA_BLS mode in accordance with the present principles.

Turning to FIG. 8, an exemplary decoding process for macroblock adaptive selection of INTRA_BL and INTRA_BLS modes is indicated by the reference numeral 800.

A start block 805 passes control to a decision block 810. The decision block 810 determines whether or not a current macroblock was encoded using INTRA_BL mode. If not, then control is passed to a decision block 815. Otherwise, control is passed to a function block 830.

The decision block 815 determines whether or not the current macroblock was encoded using INTRA_BLS mode. If not, then control is passed to a function block 820. Otherwise, control is passed to a function block 835.

The function block 830 decodes the current macroblock using INTRA_BL mode, and passes control to a function block 825.

The function block 835 decodes the current macroblock using INTRA_BLS mode, and passes control to the function block 825.

The function block 820 decodes the current macroblock using another prediction mode (other than INTRA_BL or INTRA_BLS), and passes control to the function block 825.

The function block 825 outputs the decoded current macroblock, and passes control to an end block 840.

Table 2 indicates the syntax used to specify the intra_4x4 prediction of the 4x3 luma block with index luma4x4BlkIdx=0 . . . 15.

TABLE 2

```
if( MbPartPredMode( mb_type, 0 ) = = Intra_4x4 )
    for( luma4x4BlkIdx=0; luma4x4BlkIdx<16; luma4x4BlkIdx++ ) {
        prev_intra4x4_pred_mode_flag[ luma4x4BlkIdx ]        2  u(1) | ae(v)
        if( !prev_intra4x4_pred_mode_flag[ luma4x4BlkIdx ] )
            rem_intra4x4_pred_mode[ luma4x4BlkIdx ]          2  u(3) | ae(v)
    }
```

Intra4x4PredMode[luma4x4Blkldx] is derived by applying the following procedure, where A and B are left and upper neighbor of the 4x4 luma block:

```
predIntra4x4PredMode = Min( intraMxMPredModeA,
intraMxMPredModeB )
if( prev_intra4x4_pred_mode_flag[ luma4x4BlkIdx ] )
    Intra4x4PredMode[ luma4x4BlkIdx ] = predIntra4x4PredMode
else
    if( rem_intra4x4_pred_mode[ luma4x4BlkIdx ] <
    predIntra4x4PredMode )
```

-continued

```
        Intra4x4PredMode[ luma4x4BlkIdx ] =
            rem_intra4x4_pred_mode[ luma4x4BlkIdx ]
    else
        Intra4x4PredMode[ luma4x4BlkIdx ] =
            rem_intra4x4_pred_mode[ luma4x4BlkIdx ] + 1
```

In the H.264 standard, the PredMode of spatial neighboring block is used to reduce the overhead to code the intra4x4 prediction. In an embodiment relating to a scalable video coding scheme for the enhancement layer, if corresponding base layer macroblock is coded as intra, it is proposed to encode intra4x4 PredMode based on both the upsampled base layer intra4x4 PredMode and its spatial neighboring block PredMode in the enhancement layer, as show in Equation 1, where F is an arbitrary function.

$$\text{Intra4x4PredMode} = F(\text{intraMxMPredModeA}, \text{intraMx MPredModeB}, \text{intraMxMPredMode-Base}) \quad (1)$$

Table 3 indicates syntax satisfying Equation (1) and used to specify the intra4x4 PredMode based on both the upsampled base layer intra4x4PreMode and its spatial neighboring block PredMode in the enhancement layer when the corresponding base layer macroblock is coded as intra.

TABLE 3

```
if( MbPartPredMode( mb_type, 0 ) = = Intra_4x4 )
    for( luma4x4BlkIdx=0; luma4x4BlkIdx<16; luma4x4BlkIdx++ ) {
        prev_intra4x4_pred_mode_flag[ luma4x4BlkIdx ]       2  u(2) | ae(v)
        if( prev_intra4x4_pred_mode_flag[ luma4x4BlkIdx ] == 0 )
            rem_intra4x4_pred_mode[ luma4x4BlkIdx ]         2  u(3) | ae(v)
    }
```

Intra4x4PredMode[luma4x4Blkldx] is derived by applying the following procedure:

```
predIntra4x4PredMode = Min( intraMxMPredModeA,
intraMxMPredModeB )
if( prev_intra4x4_pred_mode_flag[ luma4x4BlkIdx ] == 1)
    Intra4x4PredMode[ luma4x4BlkIdx ] =
        predIntra4x4PredMode
else if( prev_intra4x4_pred_mode_flag[ luma4x4BlkIdx ] == 2)
    Intra4x4PredMode[ luma4x4BlkIdx ] = intraMxMPredModeBase
else
```

Table 4 indicates syntax satisfying Equation (1) and used to specify the intra4x4PredMode. In Table 4, intra4x4Pred- Mode is forced to equal predintra4×4PredMode if predintra4×4PredMode==intraM×MPredModeBase.

TABLE 4

```
if( MbPartPredMode( mb_type, 0 ) = = Intra_4x4 )
    for( luma4x4BlkIdx=0; luma4x4BlkIdx<16; luma4x4BlkIdx++ ) {
        if (predIntra4x4PredMode != intraMxMPredModeBase) {
            prev_intra4x4_pred_mode_flag[ luma4x4BlkIdx ]       2   u(1) | ae(v)
            if( prev_intra4x4_pred_mode_flag[ luma4x4BlkIdx ] == 0 )
                rem_intra4x4_pred_mode[ luma4x4BlkIdx ]         2   u(3) | ae(v)
        }
    }
```

Intra4×4PredMode[luma4×4Blkldx] is derived by applying the following procedure:

```
predIntra4x4PredMode = Min( intraMxMPredModeA,
intraMxMPredModeB )
if (predIntra4x4PredMode == intraMxMPredModeBase)
    Intra4x4PredMode[ luma4x4BlkIdx ] = predIntra4x4PredMode
else
    if( prev_intra4x4_pred_mode_flag[ luma4x4BlkIdx ] == 1)
        Intra4x4PredMode[ luma4x4BlkIdx ] = predIntra4x4PredMode
    else
        if( rem_intra4x4_pred_mode[ luma4x4BlkIdx ] <
        predIntra4x4PredMode )
            Intra4x4PredMode[ luma4x4BlkIdx ] =
                rem_intra4x4_pred_mode[luma4x4BlkIdx ]
        else
            Intra4x4PredMode[ luma4x4BlkIdx ] =
                rem_intra4x4_pred_mode[luma4x4BlkIdx ] + 1
```

It is to be appreciated that while the above description and examples relate to the use of intra4×4PredMode, the present principles are not so limited and, thus, given the teachings of the present principles provided herein, one of ordinary skill in this and related arts will contemplate this and other modes to which the present principles may be applied while maintaining the scope of the present invention. For example, the present principles may also be applied, but is not limited to, intra8×8 PredMode.

A description will now be given of some of the many attendant advantages/features of the present invention. For example, one advantage/feature is a scalable video encoder that includes an encoder for selectively using spatial intra prediction to code, on a macroblock adaptive basis, an enhancement layer residue generated between an enhancement layer macroblock and a corresponding upsampled base layer macroblock. Another advantage/feature is the scalable video encoder as described above, wherein the spatial intra prediction used to code the enhancement layer residue is compliant with existing spatial intra prediction techniques. Yet another advantage/feature is the scalable video encoder as described above, wherein the encoder adds a syntax field in a macroblock header to indicate which prediction mode is used for the enhancement layer residue. Moreover, another advantage/feature is the scalable video encoder as described above, wherein the encoder modifies an existing syntax to provide an inference as to which prediction mode is used for the enhancement layer residue, when the base layer prediction mode is intra. Further, another advantage/feature is the scalable video encoder that modified an existing syntax as described above, wherein the encoder uses a prediction mode other than the spatial intra prediction to code the enhancement layer residue, when the base layer prediction mode is constrained to inter. Also, another advantage/feature is the scalable video encoder as described above, wherein the encoder determines which prediction mode to use on the enhancement layer from among different available prediction modes including an enhancement layer residue without spatial intra prediction mode, an enhancement layer residue with spatial intra prediction mode, and an enhancement layer pixel with spatial intra prediction mode. Additionally, another advantage/feature is the scalable video encoder for determining which prediction mode to use on the enhancement layer as described above, wherein the encoder determines which prediction mode to use for the enhancement layer from the different available prediction modes based on an a posteriori decision criteria, or on past statistics of the different available prediction modes and properties of the enhancement layer residue and enhancement layer pixels. Moreover, another advantage/feature is a scalable video encoder that includes an encoder for coding an enhancement layer using both a spatial neighboring intra prediction mode in the enhancement layer and an upsampled corresponding base layer prediction mode. Further, another advantage/feature is the scalable video encoder as described above, wherein the encoder adds a flag in a macroblock header without signaling a prediction mode, when the spatial neighboring intra prediction mode used in the enhancement layer is the same as the upsampled corresponding base layer prediction mode. Also, another advantage/feature is the scalable video encoder as described above, wherein the encoder forces a current intra prediction mode to be the same as the upsampled corresponding base layer mode without sending corresponding syntax, when the spatial neighboring intra prediction mode is the same as the upsampled corresponding base layer prediction mode. Additionally, another advantage/feature is a scalable video decoder that includes a decoder for selectively using spatial intra prediction to decode, on a macroblock adaptive basis; an enhancement layer residue generated between an enhancement layer macroblock and a corresponding upsampled base layer macroblock. Moreover, another advantage/feature is the scalable video decoder as described above, wherein the spatial intra prediction used to decode the enhancement layer residue is compliant with existing spatial intra prediction techniques. Further, another advantage/feature is the scalable video decoder as described above, wherein the decoder determines which prediction mode to use for the enhancement layer residue using a syntax field in a macroblock header. Also, another advantage/feature is the scalable video decoder as described above, wherein the decoder evaluates an inference, provided in a modified existing syntax, as to which prediction mode was used to code the enhancement layer residue, when the base layer prediction mode is intra. Additionally, another advantage/feature is the scalable video decoder that modifies an existing syntax as described above, wherein the decoder uses a prediction mode other than the spatial intra prediction to decode the enhancement layer residue, when the base layer prediction mode is constrained to inter. Moreover, another advantage/feature is the scalable video decoder as described above, wherein the decoder determines a prediction mode for use on the enhancement layer residue based on parsed syntax, the prediction mode determined from among any of an enhancement layer residue without spatial intra prediction mode, an enhancement layer residue with spatial intra prediction mode, and an enhancement layer pixel with spatial intra prediction mode. Also, another advantage/feature is a scalable video decoder that includes a decoder for decoding an enhancement layer using both a spatial neighboring intra prediction mode in the enhancement layer and an upsampled corresponding base layer prediction mode. Additionally, another advantage/feature is the scalable video decoder as described above, wherein the decoder forces a current intra prediction mode to be the same as the upsampled corresponding base layer mode without receiving corresponding syntax, when the spatial neighboring intra prediction mode is the same as the upsampled corresponding base layer prediction mode. Moreover, another advantage/feature is the scalable video decoder as described above, wherein the decoder determines which intra prediction mode to use for the enhancement layer based on a flag in a macroblock header. Further, another advantage/feature is the scalable video decoder as described above, wherein the decoder determines an intra prediction mode for the enhancement layer to be the same as the upsampled corresponding base layer mode, when the spatial neighboring intra prediction mode is the same as the upsampled corresponding base layer mode.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus comprising an encoder, selectively using spatial intra prediction to code, on a macroblock adaptive basis, an enhancement layer residue generated between an enhancement layer macroblock and a corresponding upsampled base layer macroblock.

2. The apparatus of claim 1, wherein the spatial intra prediction used to code the enhancement layer residue is compliant with spatial intra prediction techniques of the International Telecommunication Union, Telecommunication Sector (ITU-T) H.264 standard.

3. The apparatus of claim 1, wherein said encoder adds a syntax field in a macroblock header to indicate which prediction mode is used for the enhancement layer residue.

4. The apparatus of claim 1, wherein said encoder modifies a syntax of the International Telecommunication Union, Telecommunication Sector (ITU-T) H.264 standard to provide an inference as to which prediction mode is used for the enhancement layer residue, when the base layer prediction mode is intra.

5. The apparatus of claim 4, wherein said encoder uses a prediction mode other than the spatial intra prediction to code the enhancement layer residue, when the base layer prediction mode is constrained to inter.

6. The apparatus of claim 1, wherein said encoder determines which prediction mode to use on the enhancement layer from among different available prediction modes, the different available prediction modes comprising an enhancement layer residue without spatial intra prediction mode, an enhancement layer residue with spatial intra prediction mode, and an enhancement layer pixel with spatial intra prediction mode.

7. The apparatus of claim 6, wherein said encoder determines which prediction mode to use for the enhancement layer from the different available prediction modes based on an a posteriori decision criteria, or on past statistics of the different available prediction modes and properties of the enhancement layer residue and enhancement layer pixels.

8. A method for scalable video encoding, comprising selectively using spatial intra prediction to code, on a macroblock adaptive basis, an enhancement layer residue generated between an enhancement layer macroblock and a corresponding upsampled base layer macroblock.

9. The method of claim 8, wherein the spatial intra prediction used to code the enhancement layer residue is compliant with spatial intra prediction techniques of the International Telecommunication Union, Telecommunication Sector (ITU-T) H.264 standard.

10. The method of claim 8, further comprising adding a syntax field in a macroblock header to indicate which prediction mode is used for the enhancement layer residue.

11. The method of claim 8, further comprising modifying a syntax of the International Telecommunication Union, Telecommunication Sector (ITU-T) H.264 standard to provide an inference as to which prediction mode is used for the enhancement layer residue, when the base layer prediction mode is intra.

12. The method of claim 11, further comprising using a prediction mode other than the spatial intra prediction to code the enhancement layer residue, when the base layer prediction mode is constrained to inter.

13. The method of claim 8, further comprising determining which prediction mode to use on the enhancement layer from among different available prediction modes, the different available prediction modes comprising an enhancement layer residue without spatial intra prediction mode, an enhancement layer residue with spatial intra prediction mode, and an enhancement layer pixel with spatial intra prediction mode.

14. The method of claim 13, further comprising determining which prediction mode to use for the enhancement layer from the different available prediction modes based on an a posteriori decision criteria, or on past statistics of the different available prediction modes and properties of the enhancement layer residue and enhancement layer pixels.

15. An apparatus comprising an encoder, coding an enhancement layer using both a spatial neighboring intra prediction mode in the enhancement layer and an upsampled corresponding base layer prediction mode.

16. The apparatus of claim 15, wherein said encoder adds a flag in a macroblock header without signaling a prediction mode, when the spatial neighboring intra prediction mode used in the enhancement layer is the same as the upsampled corresponding base layer prediction mode.

17. The apparatus of claim 15, wherein said encoder forces a current intra prediction mode to be the same as the upsampled corresponding base layer mode without sending corresponding syntax, when the spatial neighboring intra prediction mode is the same as the upsampled corresponding base layer prediction mode.

18. A method for scalable video encoding, comprising coding an enhancement layer using both a spatial neighboring intra prediction mode in the enhancement layer and an upsampled corresponding base layer prediction mode.

19. The method of claim 18, further comprising adding a flag in a macroblock header without signaling a prediction mode, when the spatial neighboring intra prediction mode used in the enhancement layer is the same as the upsampled corresponding base layer prediction mode.

20. The method of claim 18, further comprising forcing a current intra prediction mode to be the same as the upsampled corresponding base layer mode without sending corresponding syntax, when the spatial neighboring intra prediction mode is the same as the upsampled corresponding base layer prediction mode.

21. An apparatus comprising a decoder, selectively using spatial intra prediction to decode, on a macroblock adaptive basis, an enhancement layer residue generated between an enhancement layer macroblock and a corresponding upsampled base layer macroblock.

22. The apparatus of claim 21, wherein the spatial intra prediction used to decode the enhancement layer residue is compliant with spatial intra prediction techniques of the International Telecommunication Union, Telecommunication Sector (ITU-T) H.264 standard.

23. The apparatus of claim 21, wherein said decoder determines which prediction mode to use for the enhancement layer residue using a syntax field in a macroblock header.

24. The apparatus of claim 21, wherein said decoder evaluates an inference, provided in a modified syntax of the International Telecommunication Union, Telecommunication Sector (ITU-T) H.264 standard, as to which prediction mode was used to code the enhancement layer residue, when the base layer prediction mode is intra.

25. The apparatus of claim 24, wherein said decoder uses a prediction mode other than the spatial intra prediction to decode the enhancement layer residue, when the base layer prediction mode is constrained to inter.

26. The apparatus of claim 21, wherein said decoder determines a prediction mode for use on the enhancement layer residue based on parsed syntax, the prediction mode determined from among any of an enhancement layer residue without spatial intra prediction mode, an enhancement layer residue with spatial intra prediction mode, and an enhancement layer pixel with spatial intra prediction mode.

27. A method for scalable video decoding, comprising selectively using spatial intra prediction to decode, on a macroblock adaptive basis, an enhancement layer residue generated between an enhancement layer macroblock and a corresponding upsampled base layer macroblock.

28. The method of claim 27, wherein the spatial intra prediction used to decode the enhancement layer residue is compliant with spatial intra prediction techniques of the International Telecommunication Union, Telecommunication Sector (ITU-T) H.264 standard.

29. The method of claim 27, further comprising determining which prediction mode to use for the enhancement layer residue using a syntax field in a macroblock header.

30. The method of claim 27, further comprising evaluating an inference, provided in a modified syntax of the International Telecommunication Union, Telecommunication Sector (ITU-T) H.264 standard, as to which prediction mode was used to code the enhancement layer residue, when the base layer prediction mode is intra.

31. The method of claim 30, further comprising using a prediction mode other than the spatial intra prediction to decode the enhancement layer residue, when the base layer prediction mode is constrained to inter.

32. The method of claim 27, further comprising determining, based on parsed syntax, which prediction mode to use on the enhancement layer residue from among an enhancement layer residue without spatial intra prediction mode, an enhancement layer residue with spatial intra prediction mode, and an enhancement layer pixel with spatial intra prediction mode.

33. An apparatus comprising a decoder, decoding an enhancement layer using both a spatial neighboring intra prediction mode in the enhancement layer and an upsampled corresponding base layer prediction mode.

34. The apparatus of claim 33, wherein said decoder forces a current intra prediction mode to be the same as the upsampled corresponding base layer mode without receiving corresponding syntax, when the spatial neighboring intra prediction mode is the same as the upsampled corresponding base layer prediction mode.

35. The apparatus of claim 33, wherein said decoder determines which intra prediction mode to use for the enhancement layer based on a flag in a macroblock header.

36. The apparatus of claim 33, wherein said decoder determines an intra prediction mode for the enhancement layer to be the same as the upsampled corresponding base layer mode, when the spatial neighboring intra prediction mode is the same as the upsampled corresponding base layer mode.

37. A method for scalable video decoding, comprising decoding an enhancement layer using both a spatial neighboring intra prediction mode in the enhancement layer and an upsampled corresponding base layer prediction mode.

38. The method of claim 37, further comprising forcing a current intra prediction mode to be the same as the upsampled corresponding base layer mode without receiving corresponding syntax, when the spatial neighboring intra prediction mode is the same as the upsampled corresponding base layer prediction mode.

39. The method of claim 37, further comprising determining which intra prediction mode to use for the enhancement layer based on a flag in a macroblock header.

40. The method of claim 37, further comprising determining an intra prediction mode for the enhancement layer to be the same as the upsampled corresponding base layer mode, when the spatial neighboring intra prediction mode is the same as the upsampled corresponding base layer mode.

* * * * *